(12) United States Patent
Ebisuno

(10) Patent No.: US 12,387,369 B2
(45) Date of Patent: Aug. 12, 2025

(54) ESTIMATION DEVICE, LEARNING DEVICE, TEACHING DATA CREATION DEVICE, ESTIMATION METHOD, LEARNING METHOD, TEACHING DATA CREATION METHOD, AND RECORDING MEDIUM FOR ESTIMATING SKELETON INFORMATION OF SUBJECT BASED ON IMAGE THEREOF

(71) Applicant: OMRON Corporation, Kyoto (JP)

(72) Inventor: Soichi Ebisuno, Kyoto (JP)

(73) Assignee: OMRON Corporation, Kyoto (JP)

( * ) Notice: Subject to any disclaimer, the term of this patent is extended or adjusted under 35 U.S.C. 154(b) by 443 days.

(21) Appl. No.: 17/911,422

(22) PCT Filed: Mar. 5, 2021

(86) PCT No.: PCT/JP2021/008703
§ 371 (c)(1),
(2) Date: Sep. 14, 2022

(87) PCT Pub. No.: WO2021/215129
PCT Pub. Date: Oct. 28, 2021

(65) Prior Publication Data
US 2023/0101893 A1    Mar. 30, 2023

(30) Foreign Application Priority Data

Apr. 20, 2020    (JP) .................................. 2020-074799

(51) Int. Cl.
*G06T 7/00* (2017.01)
*G06T 5/77* (2024.01)
(Continued)

(52) U.S. Cl.
CPC .................. *G06T 7/73* (2017.01); *G06T 5/77* (2024.01); *G06T 7/60* (2013.01);
(Continued)

(58) Field of Classification Search
CPC . G06T 2207/30196; G06T 2207/20081; G06T 2207/20084; G06T 7/70;
(Continued)

(56) References Cited

U.S. PATENT DOCUMENTS

| 10,540,757 | B1* | 1/2020 | Bouhnik .................... G06T 3/14 |
| 2010/0303290 | A1* | 12/2010 | Mathe ...................... G06T 17/05 |
| | | | 382/103 |

(Continued)

FOREIGN PATENT DOCUMENTS

| JP | 2017091377 | 5/2017 |
| WO | 2019224947 | 11/2019 |

OTHER PUBLICATIONS

Zhe Cao et al., "OpenPose: Realtime Multi-Person 2D Pose Estimation using Part Affinity Fields", IEEE Transactions on Pattern Analysis and Machine Intelligence, May 2019, pp. 1-14.

(Continued)

*Primary Examiner* — Li Liu
(74) *Attorney, Agent, or Firm* — JCIPRNET

(57) ABSTRACT

In an image having a blank region, the present invention estimates skeleton information having a part of a joint in the blank region. An estimation device (1) is provided with: an input part (130) for acquiring a first image that includes a first joint and does not include a second joint of the subject; a blank region expansion part (101) for generating a second image from the first image by expanding the blank region; and an estimation part (12) for estimating, using the second image and a prelearned estimation model, skeleton information that includes the joint position of the second joint located in the blank region.

18 Claims, 10 Drawing Sheets

(51) Int. Cl.
*G06T 7/60* (2017.01)
*G06T 7/73* (2017.01)

(52) U.S. Cl.
CPC ............... *G06T 2207/20044* (2013.01); *G06T 2207/20081* (2013.01); *G06T 2207/30196* (2013.01)

(58) Field of Classification Search
CPC .......... G06T 7/75; G06V 40/23; G06V 10/82; G06V 10/25; G06V 2201/033; G06N 20/00
See application file for complete search history.

(56) References Cited

U.S. PATENT DOCUMENTS

| | | | | |
|---|---|---|---|---|
| 2012/0309532 A1* | 12/2012 | Ambrus | ................ | G06T 11/20 463/36 |
| 2015/0046375 A1* | 2/2015 | Mandel | ................ | G06T 13/40 345/474 |
| 2018/0225517 A1* | 8/2018 | Holzer | ................ | H04L 65/756 |
| 2019/0066327 A1* | 2/2019 | Fujimoto | ................ | G06T 7/60 |
| 2020/0042782 A1* | 2/2020 | Masui | ................ | G06T 7/55 |
| 2022/0108468 A1* | 4/2022 | Nakamura | ................ | G06T 7/73 |
| 2022/0265228 A1* | 8/2022 | Shimizu | ................ | G06T 1/00 |
| 2022/0301352 A1* | 9/2022 | Sato | ................ | G06V 40/23 |
| 2023/0141494 A1* | 5/2023 | Brown | ................ | G06V 10/25 345/418 |

OTHER PUBLICATIONS

"International Search Report (Form PCT/ISA/210) of PCT/JP2021/008703," mailed on Apr. 6, 2021, with English translation thereof, pp. 1-4.

"Written Opinion of the International Searching Authority (Form PCT/ISA/237) of PCT/JP2021/008703," mailed on Apr. 6, 2021, with English translation thereof, pp. 1-6.

* cited by examiner

ESTIMATION DEVICE, LEARNING DEVICE, TEACHING DATA CREATION DEVICE, ESTIMATION METHOD, LEARNING METHOD, TEACHING DATA CREATION METHOD, AND RECORDING MEDIUM FOR ESTIMATING SKELETON INFORMATION OF SUBJECT BASED ON IMAGE THEREOF

CROSS-REFERENCE TO RELATED APPLICATION

This application is a 371 application of the International PCT application serial no. PCT/JP2021/008703, filed on Mar. 5, 2021, which claims the priority benefits of Japan Patent Application No. 2020-074799, filed on Apr. 20, 2020. The entirety of each of the above-mentioned patent applications is hereby incorporated by reference herein and made a part of this specification.

TECHNICAL FIELD

The present invention relates to an estimation device or the like that estimates a skeleton position of a subject using an image of the subject.

RELATED ART

The work of factory workers (subject) is being improved by analyzing human movement. In the past, humans measure the work time by watching videos taken with a video camera to improve the work. Attempts to automate human motion analysis are also progressing, and skeleton estimation, which is estimation of the positions and correspondence relationship of joints using deep learning, is known as a conventional technique (see Non-Patent Literature 1).

CITATION LIST

Non-Patent Literature

[Non-Patent Literature 1] "OpenPose: Realtime Multi-Person 2D Pose Estimation using Part Affinity Fields", IEEE TRANSACTIONS ON PATTERN ANALYSIS AND MACHINE INTELLIGENCE, 2019

SUMMARY OF INVENTION

Technical Problem

However, for the conventional technique as described above, from the viewpoint of privacy protection and work analyticity on the work desk, it is required to photograph at an angle (for example, from above) where the face of the worker (subject) is not shown.

OpenPose relating to Non-Patent Literature 1 can be mentioned as the skeleton estimation based on the existing deep learning. In OpenPose, the skeleton cannot be stably estimated from an image that does not include the shoulder or neck joint due to the mechanism of the processing range.

One aspect of the present invention is to stably estimate skeleton information including a joint position of a joint of a subject from an image that does not include some joints of the subject.

Solution to Problem

In order to solve the above problem, an estimation device according to one aspect of the present invention includes an image acquisition part acquiring a first image that includes a first joint and does not include a second joint of a subject; a blank region expansion part generating a second image obtained by expanding the first image with a blank region; and an estimation part estimating skeleton information including a joint position of the second joint located in the blank region using the second image and a learned estimation model.

In order to solve the above problem, a learning device according to one aspect of the present invention includes an image acquisition part acquiring a first image that includes a first joint and does not include a second joint of a subject; a blank region expansion part generating a second image obtained by expanding the first image with a blank region; a teaching data storage part storing teaching data including skeleton information, which includes the second joint located in the blank region, and the second image; and a learning part learning an estimation model of skeleton information from the skeleton information and the second image using the teaching data.

In order to solve the above problem, a teaching data creation device according to one aspect of the present invention includes an image acquisition part acquiring a first image that includes a first joint and does not include a second joint of a subject; a blank region expansion part generating a second image obtained by expanding the first image with a blank region; a display control part displaying the second image; an input part receiving input of a joint position of the second joint with respect to the blank region in the second image from a user; and a teaching data creation part creating teaching data in which skeleton information including joint positions of the first joint and the second joint is associated with the second image.

An estimation method according to one aspect of the present invention includes an image acquisition step of acquiring a first image that includes a first joint and does not include a second joint of a subject; a blank region expansion step of generating a second image obtained by expanding the first image with a blank region; and an estimation step of estimating skeleton information including a joint position of the second joint located in the blank region using the second image and a learned estimation model.

A learning method according to one aspect of the present invention includes an image acquisition step of acquiring a first image that includes a first joint and does not includes a second joint of a subject; a blank region expansion step of generating a second image obtained by expanding the first image with a blank region; a teaching data acquisition step of acquiring teaching data including skeleton information, which includes the second joint located in the blank region, and the second image; and a learning step of learning an estimation model of skeleton information from the skeleton information and the second image using the teaching data.

A teaching data creation method according to one aspect of the present invention includes an image acquisition step of acquiring a first image that includes a first joint and does not include a second joint of a subject; a blank region expansion step of generating a second image obtained by expanding the first image with a blank region; a display control step of displaying the second image; an input step of receiving input of a joint position of the second joint with respect to the blank region in the second image from a user; and a teaching data creation step of creating teaching data in which skeleton information including joint positions of the first joint and the second joint is associated with the second image.

Effects of Invention

According to one aspect of the present invention, skeleton information including a joint located in a blank region can be estimated.

DESCRIPTION OF EMBODIMENTS

Hereinafter, an embodiment according to one aspect of the present invention (hereinafter, also referred to as "the present embodiment") will be described with reference to the drawings.

First Embodiment

1. Application Example

An estimation device is a device that estimates skeleton information of a worker using an image of the worker (subject). The skeleton information includes information of each joint position of the worker. The joint position of the worker represents a posture of the worker corresponding to a work operation.

Prior to the above estimation, the estimation device learns an estimation model used for the estimation. Specifically, the estimation device associates an image of the worker taken from above with skeleton information included in the image or composed of joint positions that can be inferred by a human, and generates it as teaching data. The estimation device learns the estimation model using the generated teaching data.

Since the image of the worker taken from above does not include the face of the worker, some joints of the worker, such as the neck joint, are not included. In the above learning, an image in which a blank region is set for an image of some missing joints is used for learning. Thereby, the estimation model that estimates the missing joint positions in the blank region is generated.

After generating the estimation model as described above, the image in which a part of a joint is missing is input to the estimation device and estimated using the estimation model, so that the skeleton information can be estimated while protecting privacy.

2. Configuration Example

Figure 1:
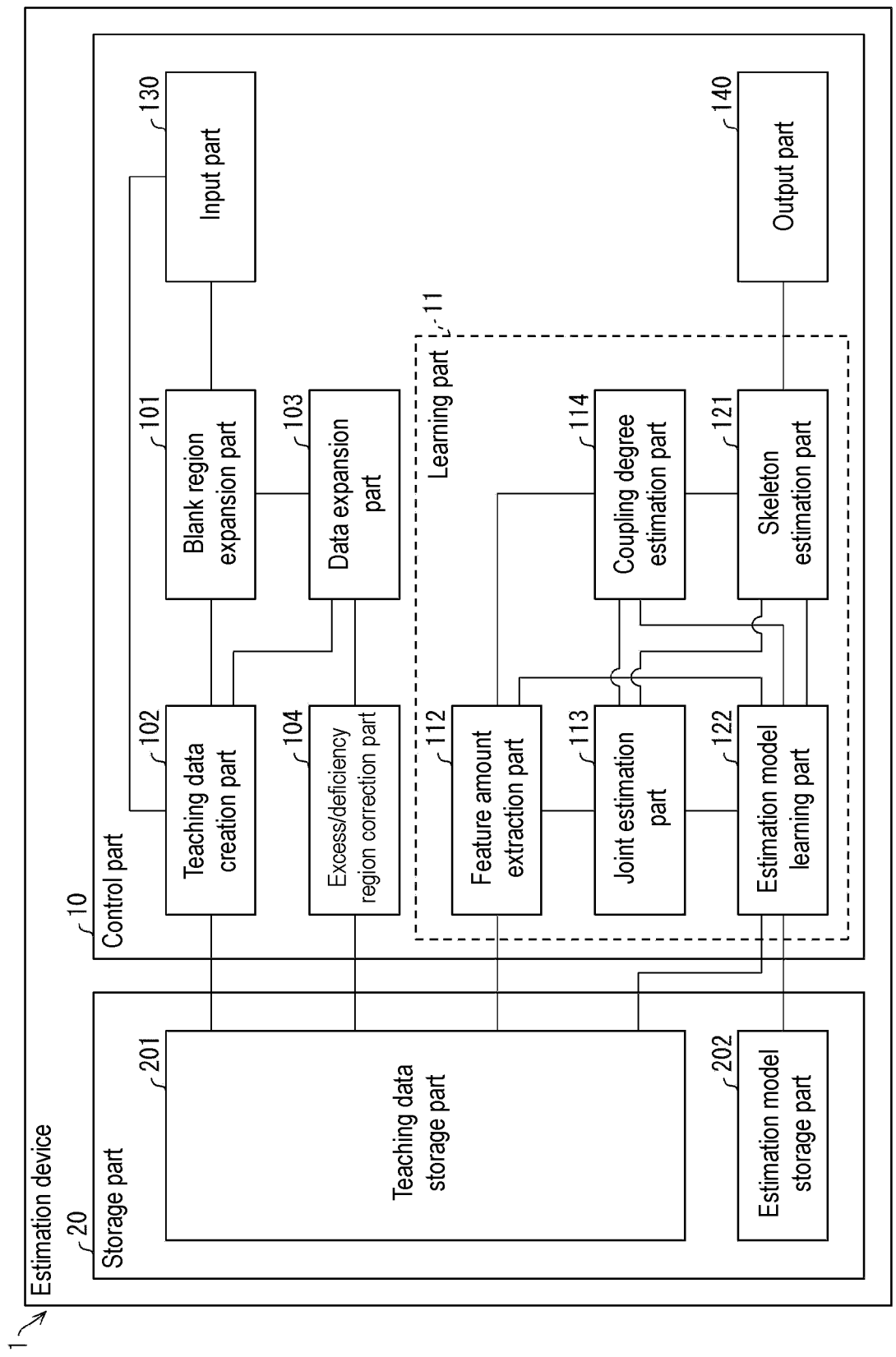
FIG. 1 is a block diagram showing an example of the components in the learning operation of the estimation device according to the first embodiment of the present invention.
Figure 2:
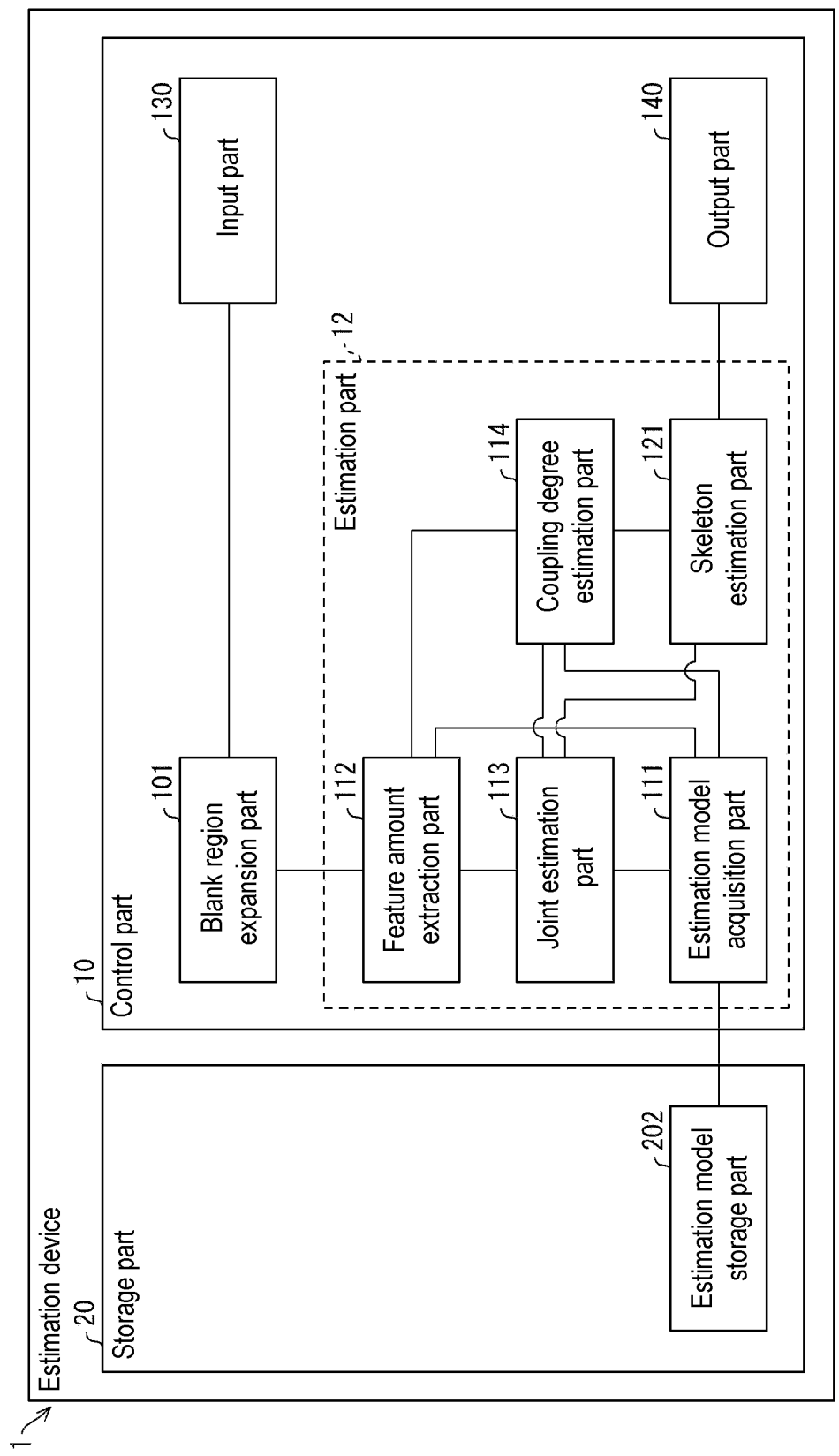
FIG. 2 is a block diagram showing an example of the components in the estimation operation of the estimation device according to the first embodiment of the present invention.
Figure 3:
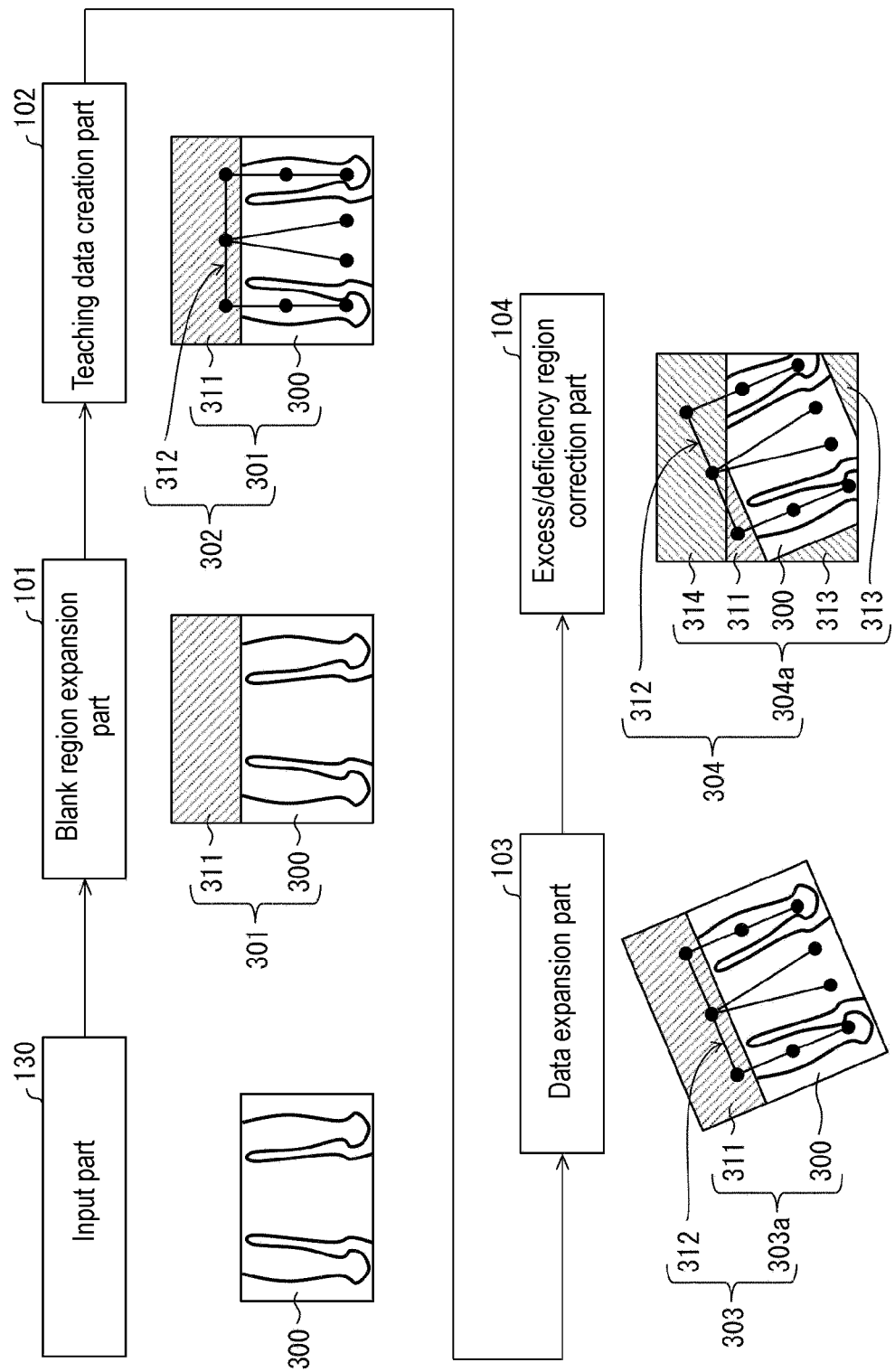
FIG. 3 is a model diagram showing the state of data of the components in the learning operation of the estimation device according to the first embodiment of the present invention.
Figure 4:
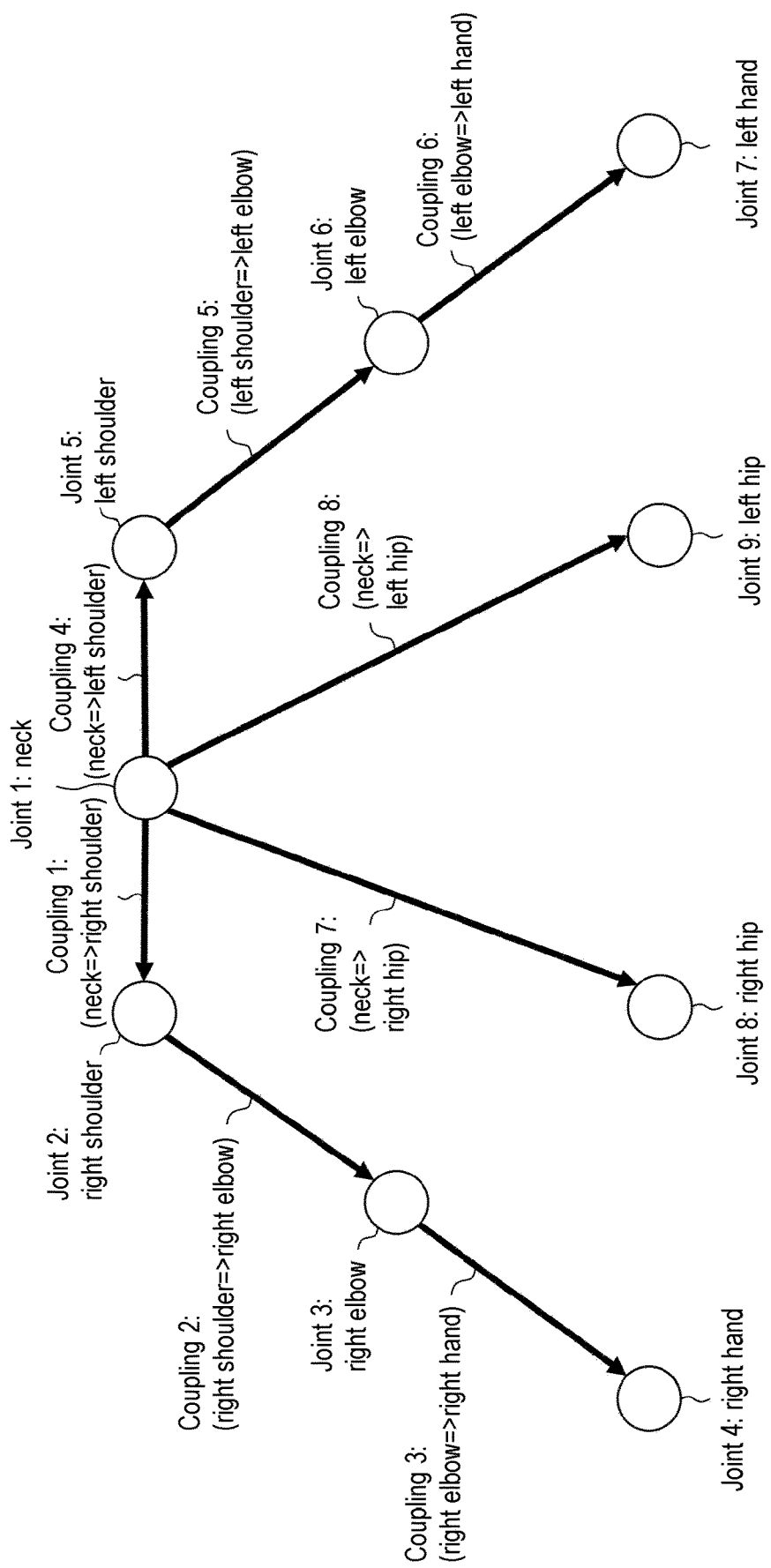
FIG. 4 is a schematic diagram of the skeleton information estimated by the estimation device according to the first embodiment of the present invention.

A configuration example of an estimation device 1 will be described with reference to FIG. 1 to FIG. 4. FIG. 1 is a block diagram showing an example of the components working in a learning operation among the components of the estimation device 1. FIG. 2 is a block diagram showing an example of the components working in an estimation operation among the components of the estimation device 1. FIG. 3 is a model diagram showing the state of data of the components in the learning operation of the estimation device 1. FIG. 4 is a schematic diagram of the skeleton information estimated by the estimation device 1.

As shown in FIG. 1 and FIG. 2, the estimation device 1 (learning device) includes a control part 10 that integrates and controls each part of the estimation device 1, and a storage part 20 that stores various data used by the estimation device.

The control part 10 includes a blank region expansion part 101, a teaching data creation part 102, a data expansion part 103, an excess/deficiency region correction part 104, an estimation model acquisition part 111, a feature amount extraction part 112, a joint estimation part 113, a coupling degree estimation part 114, a skeleton estimation part 121, an estimation model learning part 122, an input part 130, and an output part 140. Further, the storage part 20 includes a teaching data storage part 201 and an estimation model storage part 202.

In the control part 10, the learning part 11 works in the learning operation (see FIG. 1), and the estimation part 12 works in the estimation operation (see FIG. 2). The learning part 11 includes the feature amount extraction part 112, the joint estimation part 113, the coupling degree estimation part 114, the skeleton estimation part 121, and the estimation model learning part 122. The estimation part 12 includes the estimation model acquisition part 111, the feature amount extraction part 112, the joint estimation part 113, the coupling degree estimation part 114, and the skeleton estimation part 121.

The input part 130 (image acquisition part) receives data input including an image and user input to the estimation device 1. The input part 130 receives input of an image 300 and outputs the image 300 to the blank region expansion part 101. Further, the input part 130 may acquire the image 300 from a camera connected to the estimation device 1, an external server via a network, or a storage device in the estimation device 1. The input part 130 may support not only a still image but also a moving image.

The image 300 (first image) is an image showing a part of a joint of a worker, such as an elbow or hand joint, but another part of the joint of the worker, such as the neck or shoulder, is missing. Since the image 300 does not include the face of the worker, for example, the privacy of the worker can be protected. The image 300 may be an image captured from above the worker, and in this case, it is easy to capture the situation in which the worker is working. By capturing the image from above, for example, it is possible to capture a change in the position of a work target on a work desk as the situation of working. The image 300 captured from above also does not include another part of the joint of the worker, such as the neck or shoulder.

In addition, the input part 130 also receives operation input to the estimation device 1 of the user via an input device. The input device may be, for example, a pointing device such as a mouse or a touch panel, or a cross key. The input part 130 receives from the user the designation of a joint position with respect to the image. The user input may be the position designated by the pointing device for a blanked image 301, the position designated by the cross key, or the pixel coordinates of the blanked image 301 may be directly designated. The input part 130 outputs the input joint position information (teaching skeleton information 312) to the teaching data creation part 102.

The blank region expansion part 101 adds a blank region 311 adjacent to at least one side of the input image 300 to create a blanked image 301 with an expanded image range (image size). Thereafter, the blank region expansion part 101 outputs the blanked image 301 to the teaching data creation part 102 or the feature amount extraction part 112.

The blanked image 301 (second image) is an image in which the image 300 and the blank region 311 are integrated. In FIG. 3, the blank region 311 is shown by hatching that descends to the right, but is actually filled with a specific single color. The specific single color is, for example, black or white, but not limited thereto. The blank region 311 may be a region in which a specific pattern or hatching (the same pattern or hatching is applied to a plurality of blanked images 301) is applied instead of a single color. Further, in FIG. 3, the blank region 311 is adjacent to one side of the image 300, but may be adjacent to two or more sides.

The size and arrangement of the blank region may be parameters that can be set by the user input.

The teaching data creation part 102 creates skeleton-containing data 302 (teaching data) in which the teaching skeleton information 312 is associated with the blanked image 301. Thereafter, the teaching data creation part 102 outputs the skeleton-containing data 302 to the data expansion part 103.

The skeleton-containing data 302 is data composed of the blanked image 301 and the teaching skeleton information 312. The teaching skeleton information 312 includes information of the respective positions (joint positions) of multiple parts (neck, right shoulder, right elbow, right hand, left shoulder, left elbow, left hand, right hip, and left hip) of the worker corresponding to the blanked image 301.

Here, there are nine joints (parts) set as the teaching skeleton information 312, which are the neck, right shoulder, right elbow, right hand, left shoulder, left elbow, left hand, right hip, and left hip, but not limited thereto. The head and legs may be set, and some joints (right hand, etc.) may be missing. In FIG. 3, for the teaching skeleton information 312, the joints are shown by black circles and the coupling between the joints are shown by line segments.

The data expansion part 103 performs arbitrary image processing on the input skeleton-containing data 302 and creates image-processed data 303. Thereafter, the image-processed data 303 is output to the excess/deficiency region correction part 104.

The image-processed data 303 is data including an image-processed image 303a obtained by applying image processing to the blanked image 301, and the teaching skeleton information 312 subjected to the same geometric deformation as the image processing. The geometric deformation includes left/right inversion, rotation, enlargement/reduction, left/right movement, up/down movement, and projective transformation.

The image processing includes brightness change, color change, and geometric deformation. The above image processing is not limited to one type at a time, and multiple types may be applied in order. Further, the skeleton-containing data 302 may be through-output as the image-processed data 303 to the excess/deficiency region correction part 104 without any image processing.

The excess/deficiency region correction part 104 (deficiency region correction part) sets a region having no image information among the pixels in the region of the original image size (the image size of the blanked image 301) to a deficiency pixel region 313 for the image-processed image 303a of the input image-processed data 303. The excess/deficiency region correction part 104 sets the same region as the blank region 311 of the original blanked image 301 to a blank region 314 again. The excess/deficiency region correction part 104 ignores the portion of the image-processed data 303 that extends beyond the region of the original image size. The excess/deficiency region correction part 104 corrects the deficiency pixel region 313 with a blank region in the image-processed image 303a (fills it with the same single color as the blank region 311) to generate an excess/deficiency corrected image 304a.

The teaching data 304 includes the excess/deficiency corrected image 304a (second image) and the teaching skeleton information 312 subjected to the same geometric deformation as the image processing. The excess/deficiency region correction part 104 outputs the teaching data 304 to the teaching data storage part 201.

In FIG. 3, the deficiency pixel region 313 has hatching that rises to the right, but is actually filled with a single color that is the same color as the blank region 311. Further, in the processing of the data expansion part 103, the pixels in which the image disappears from the pixels in which the image was present before the image processing because the geometric deformation was performed as the image processing is also included in the above-mentioned deficiency pixel region 313. In addition, the pixels extending from the original image region due to the geometric deformation are not included in the excess/deficiency corrected image 304a.

The teaching data storage part 201 stores the input teaching data 304. Further, based on the instruction of the control part 10, the teaching data 304 is output to the feature amount extraction part 112 and the estimation model learning part 122.

The estimation model acquisition part 111 acquires the stored estimation model from the estimation model storage part 202. The estimation model acquisition part 111 outputs (a plurality of parameters of) the estimation model to the feature amount extraction part 112, the joint estimation part 113, and the coupling degree estimation part 114.

The feature amount extraction part 112 extracts the feature amount from the excess/deficiency corrected image 304a or the blanked image 301 constituting the input teaching data 304. The feature amount extraction part 112 outputs the extracted feature amount to the joint estimation part 113 and the coupling degree estimation part 114.

The joint estimation part 113 creates a joint estimation result representing the positions of a plurality of joints from the input feature amount. The joint estimation part 113 outputs the joint estimation result to the skeleton estimation part 121.

The coupling degree estimation part 114 obtains a coupling degree estimation result representing the coupling degree between joints from the input feature amount. The coupling degree estimation part 114 outputs the coupling degree estimation result to the skeleton estimation part 121.

The skeleton estimation part 121 estimates the estimated skeleton information from the input joint estimation result and coupling degree estimation result. The skeleton estimation part 121 outputs the estimated skeleton information to the estimation model learning part 122 and the output part 140.

The estimated skeleton information includes information of joint position corresponding to the worker of the image (excess/deficiency corrected image 304a or blanked image 301) used for estimation. The estimated skeleton information can include the positions of some joints, such as the neck or shoulder, located in the blank region (311 or 313) in the image (excess/deficiency corrected image 304a or blanked image 301) used for estimation.

As shown in FIG. 4, in the estimation device 1, nine joints which are the neck, right shoulder, right elbow, right hand, left shoulder, left elbow, left hand, right hip, and left hip are estimated as the joint estimation results. Furthermore, in the estimation device 1, the degrees of coupling between eight joints which are neck and right shoulder, right shoulder and right elbow, right elbow and right hand, neck and left shoulder, left shoulder and left elbow, left elbow and left hand, neck and right hip, and neck and left hip are estimated as the coupling degree estimation result.

The skeleton estimation part 121 determines the position of each joint from the relative positional relationship of the joints, the rule of coupling set for each joint, and the relative strength of the coupling degree between the joints. In particular, when the image used for estimation includes a plurality of workers, the skeleton estimation part 121 identifies which worker each joint corresponds to using the coupling degree estimation result.

The estimation model learning part 122 compares the input estimated skeleton information with the teaching skeleton information 312 in the teaching data 304. If sufficient estimation accuracy is not obtained, learning is continued, and the parameters of the feature amount extraction part 112, the joint estimation part 113, and the coupling degree estimation part 114 are corrected. Thereafter, in order to learn again, the current feature amount, the current joint estimation result, and the current coupling degree estimation result are output to the feature amount extraction part 112, the joint estimation part 113, and the coupling degree estimation part 114 to be processed again.

If sufficient estimation accuracy is obtained, the estimation model learning part 122 ends the learning, and stores the parameters of the feature amount extraction part 112, the joint estimation part 113, and the coupling degree estimation part 114 as an estimation model in the estimation model storage part 202.

The estimation model storage part 202 stores the estimation model which is the parameters of the feature amount extraction part 112, the joint estimation part 113, and the coupling degree estimation part 114. Further, the learned estimation model is output to the estimation model acquisition part 111.

The output part 140 displays the estimated skeleton information by the estimation device 1 and outputs the data from the estimation device 1.

3. Operation Example (Learning Process)

Figure 5:
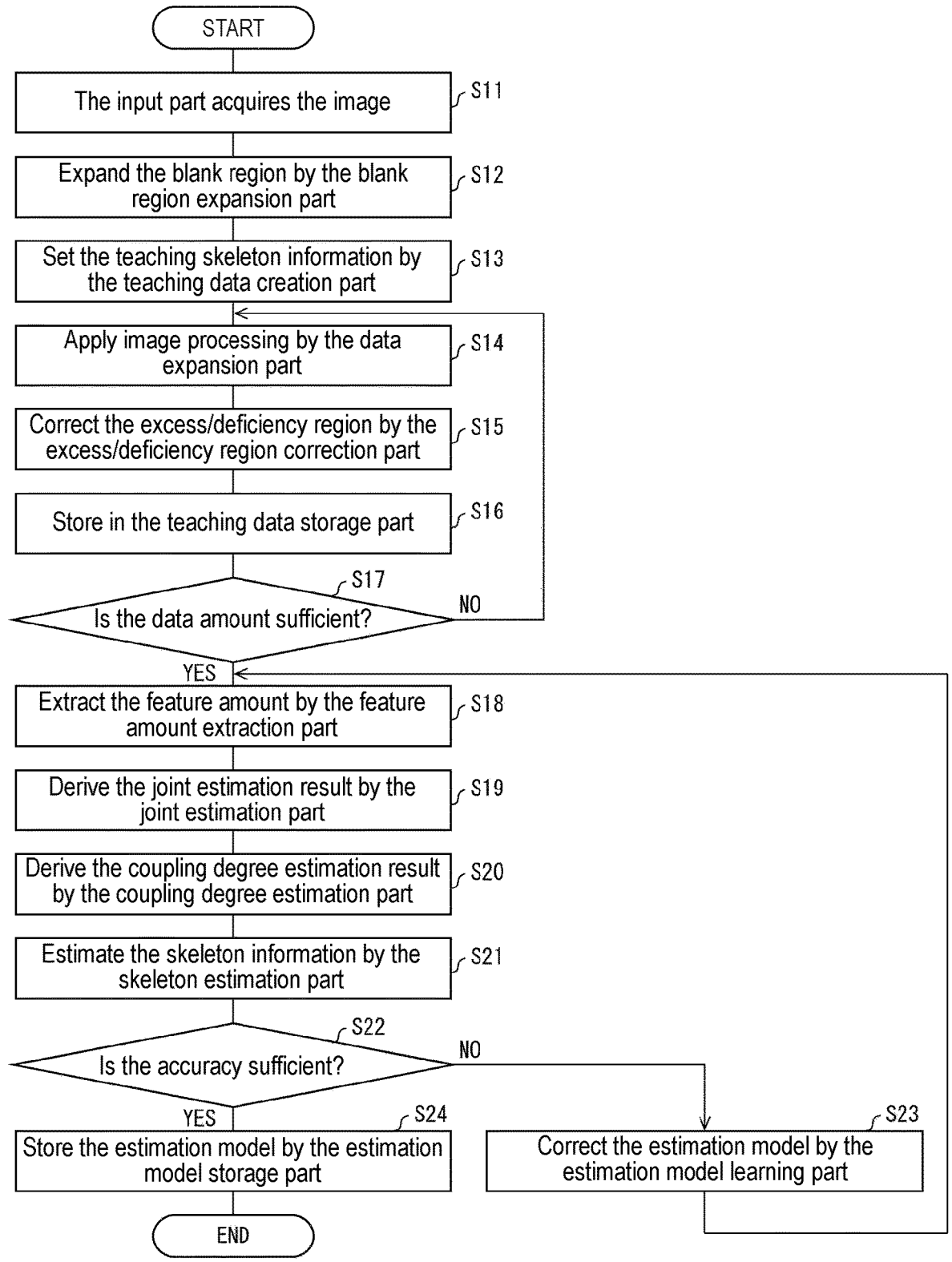
FIG. 5 is a flowchart showing the learning process of the estimation device according to the first embodiment of the present invention.

A learning process of the estimation device 1 will be described with reference to FIG. 5. FIG. 5 is a flowchart showing the learning process of the estimation device 1.

The input part 130 acquires the image 300 (S11), and outputs the image 300 to the blank region expansion part 101. The blank region expansion part 101 generates the blanked image 301 by expanding the image 300 by the blank region 311 (S12). The blank region expansion part 101 outputs the blanked image 301 to the teaching data creation part 102.

The teaching data creation part 102 creates the skeleton-containing data 302 by associating the teaching skeleton information 312 corresponding to the image 300 with the blanked image 301 (S13). The teaching data creation part 102 outputs the skeleton-containing data 302 to the data expansion part 103.

The data expansion part 103 generates the image-processed image 303a by applying image processing to the image (blanked image 301) of the skeleton-containing data 302 (S14). At this time, in the image processing in which the pixel coordinates of the joint position change, such as rotation, enlargement/reduction, left/right movement, up/down movement, and projective transformation, the data expansion part 103 also applies the same deformation to the teaching skeleton information 312. Accordingly, the data expansion part 103 generates the teaching skeleton information 312 corresponding to the image-processed image 303a. The data expansion part 103 outputs the image-processed data 303 including the image-processed image 303a and the teaching skeleton information 312 to the excess/deficiency region correction part 104.

The excess/deficiency region correction part 104 sets the region having no image information in the region of the original image size (image size of the blanked image 301) to the deficiency pixel region 313 for the image-processed image 303a of the image-processed data 303. The excess/deficiency region correction part 104 corrects the excess/deficiency region (the deficiency pixel region 313 and the region extending beyond the region of the original image size). The region extending beyond the region of the original image size is ignored. The excess/deficiency region correction part 104 fills the deficiency pixel region 313 with a single color that is the same color as the blank region. Further, the excess/deficiency region correction part 104 sets the same region as the blank region 311 of the original blanked image 301 to the blank region 314 again for the image-processed image 303a. Accordingly, the excess/deficiency region correction part 104 creates the excess/deficiency corrected image 304a (S15). The deficiency pixel region 313 and the blank region 314 have the same color, but may have different colors.

The excess/deficiency region correction part 104 creates the teaching data 304 in which the geometrically deformed teaching skeleton information 312 and the excess/deficiency corrected image 304a are combined (S15). The excess/deficiency region correction part 104 stores the created teaching data 304 in the teaching data storage part (S16).

When the amount of teaching data stored in the teaching data storage part is less than a specified amount (No in S17), the process of creating the teaching data 304 from the skeleton-containing data 302 (data expansion processing of S14 to S16) is repeated until the amount of teaching data reaches the specified amount. At this time, the image processing in the data expansion part 103 is different each time.

The type of image processing and the amount of change may be determined by random number parameters. When no image processing is performed, the skeleton-containing data 302 becomes the teaching data 304.

When the amount of teaching data stored in the teaching data storage part 201 is equal to or greater than the specified amount (Yes in S17), the control part 10 ends the creation process of the teaching data and shifts to the learning process.

The learning part 11 reads the teaching data from the teaching data storage part 201, and performs the learning process. The estimation model learning part 122 acquires the estimation model including a plurality of parameters from the estimation model storage part 202. The estimation model is a model that inputs the image and outputs the estimated skeleton information. At the time of unlearning, the estimation model includes initial parameters. The estimation model learning part 122 outputs a plurality of corresponding parameters to the feature amount extraction part 112, the joint estimation part 113, and the coupling degree estimation part 114.

The feature amount extraction part 112 extracts the feature amount from the excess/deficiency corrected image 304a in the teaching data 304 using the feature amount extraction parameter (S18). The joint estimation part 113 obtains the joint estimation result indicating the joint position based on the extracted feature amount using the joint estimation parameter (S19). The coupling degree estimation part 114 obtains the coupling degree estimation result indicating the coupling degree between the joints based on the extracted feature amount using the coupling degree estimation parameter (S20). The skeleton estimation part 121 obtains the estimated skeleton information from the joint estimation result and the coupling degree estimation result (S21).

The estimation model learning part 122 determines whether the estimated skeleton information has sufficient accuracy with respect to the teaching skeleton information 312 in the teaching data 304 (S22). The estimation model learning part 122 determines that the accuracy is sufficient if the difference between the estimated skeleton information and the teaching skeleton information is within a predetermined standard.

When the accuracy is not sufficient (No in S22), the estimation model learning part 122 corrects the parameters of the feature amount extraction part 112, the joint estimation part 113, and the coupling degree estimation part 114 (S23). In the correction, the estimation model learning part 122 corrects the parameters (learns the estimation model) so that the error between the estimated skeleton information and the teaching skeleton information 312 is reduced. The estimation model learning part 122 outputs the corrected parameters to the feature amount extraction part 112, the joint estimation part 113, and the coupling degree estimation part 114. Thereafter, the learning part 11 repeats the processing of S18 to S21. This is performed for a plurality of pieces of teaching data 304.

When sufficient accuracy is obtained (Yes in S22), the learning process is completed, and the estimation model learning part 122 stores the learned estimation model in the estimation model storage part 202 (S24). The output part 140 displays on a display device that the learning has been completed.

In S22 of FIG. 5, the completion of the learning process is triggered by sufficient accuracy, but the present invention is not limited thereto, and the learning may be completed by performing repeated learning (processing from S18 to S23) a predetermined number of times.

In addition, it is also possible to use OpenPose as similar processing from S18 to S24.

(Estimation Process)

Figure 6:
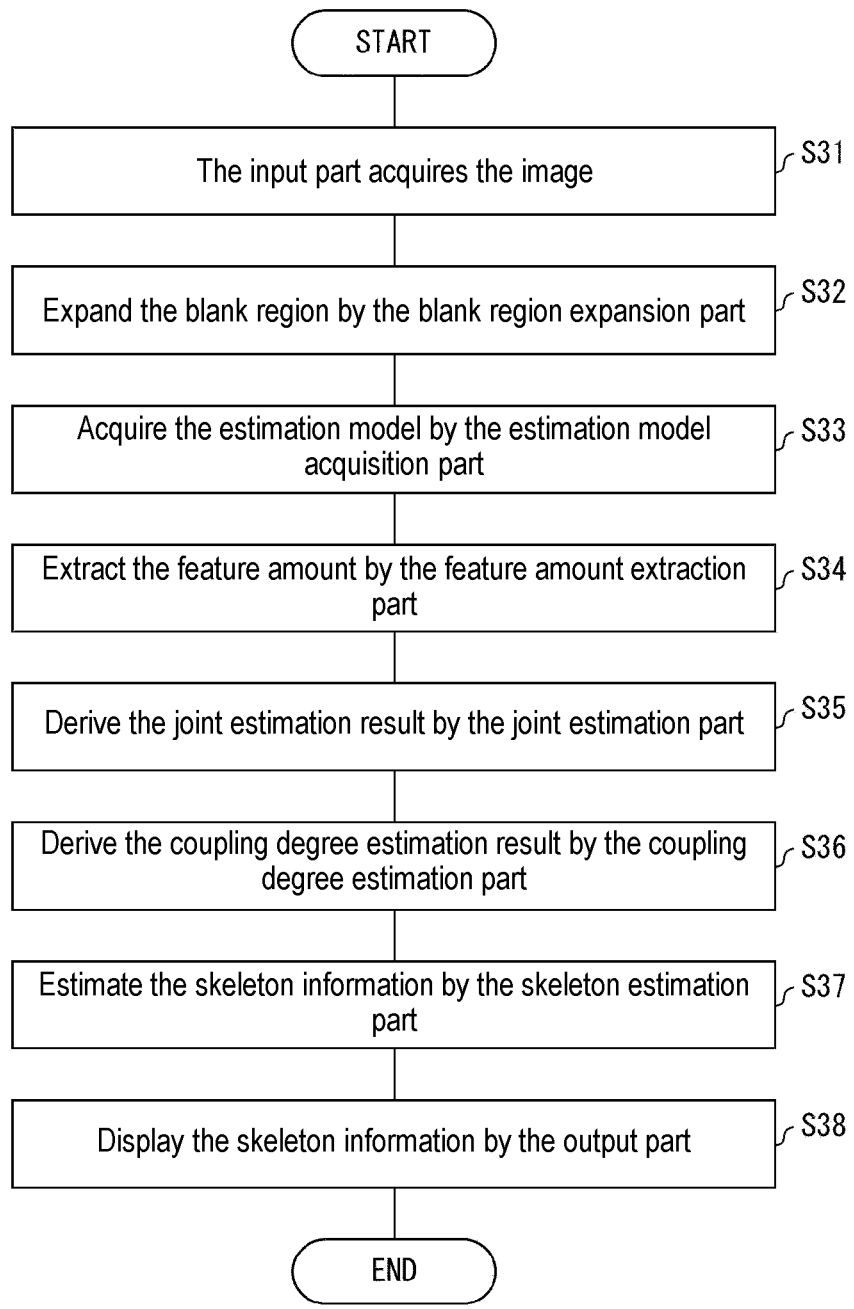
FIG. 6 is a flowchart showing the estimation process of the estimation device according to the first embodiment of the present invention.

An estimation process of the estimation device 1 will be described with reference to FIG. 6. FIG. 6 is a flowchart showing the estimation process of the estimation device 1.

The input part 130 acquires the image 300 (S31), and outputs the image 300 to the blank region expansion part 101. The blank region expansion part 101 generates the blanked image 301 by expanding the image 300 by the blank region 311 (S32). The blank region expansion part 101 outputs the blanked image 301 to the feature amount extraction part 112.

The estimation model acquisition part 111 reads the learned estimation model from the estimation model storage part 202 (S33). The estimation model acquisition part 111 outputs a plurality of parameters included in the learned estimation model to the feature amount extraction part 112, the joint estimation part 113, and the coupling degree estimation part 114.

The feature amount extraction part 112 extracts the feature amount from the blanked image 301 using the feature amount extraction parameter (S34). The joint estimation part 113 obtains the joint estimation result indicating the joint position based on the extracted feature amount using the joint estimation parameter (S35). The coupling degree estimation part 114 obtains the coupling degree estimation result indicating the coupling degree between the joints based on the extracted feature amount using the coupling degree estimation parameter (S36). The skeleton estimation part 121 obtains the estimated skeleton information from the joint estimation result and the coupling degree estimation result (S37). Thereafter, the output part 140 displays the skeleton information on the display device (S38). The output part 140 may output the skeleton information to an external server.

In addition, it is also possible to use OpenPose as similar processing from S33 to S38.

4. Function/Effect

As described above, in the estimation device 1 according to the first embodiment, after the input part 130 acquires the image 300, the blank region 311 is added to the image 300, and the teaching skeleton information 312 of the user input is taught. Thereafter, the data expansion part 103 and the excess/deficiency region correction part 104 create the teaching data 304 until the data amount required for machine learning is obtained. Machine learning is performed using the created teaching data 304 to learn the estimation model.

After learning, the input part 130 acquires a new image 300, and then the estimated skeleton information is estimated from the blanked image 301 expanded by the blank region 311 using the learned estimation model.

In this way, the estimation device 1 generates the blanked image 301 or the excess/deficiency corrected image 304a that adds the blank regions 311 and 314 to the image 300 (first image), in which the second joint is missing, as the second image. The estimation device 1 performs learning using the second image including the blank region as the input of the estimation model, and using the teaching skeleton information including the joint position of the second joint located in the blank region as the output of the estimation model. Accordingly, the estimation device 1 can create the estimation model that can estimate the skeleton information including the joint position of the second joint from the image 300 in which the second joint is missing. The estimation device 1 learns by expanding the image range to the region where the second joint is considered to be located, and thereby can appropriately infer the joint position of the second joint located in the blank region 311 that has no image information. Therefore, the estimation device 1 can estimate the estimated skeleton information including the joint positions of the first joint and the second joint from the image 300, in which the second joint is missing, using the learned estimation model.

In the related art, for example, if the neck or shoulder joint position connecting the right and left arms is not estimated (if the image does not include the neck or shoulder joint position), the positions of the joints of the right arm and the left arm cannot be estimated stably and accurately.

The estimation device 1 estimates the joint positions of the right arm and the left arm as well as the joint position of the neck (or shoulder) connecting the right arm and the left arm, even if the joint position of the neck (or shoulder) is not included in the image. Accordingly, the joint positions of the right arm and the left arm can be estimated stably and accurately.

In addition, the input part can input an image considering privacy in which the head, neck, shoulder, etc. are missing, and an image showing the situation on the work desk. By using the above image, it is possible to analyze not only the time change of the skeleton information due to the time change of the subject, but also the time change of the work target on the work desk. By analyzing these at the same time, the work analysis of the subject can be automated.

Modified Example

The joint estimation part 113 and the coupling degree estimation part 114 may be configured in multiple stages. For example, the joint estimation part 113 and the coupling degree estimation part 114 may obtain the joint estimation result and the coupling degree estimation result from the feature amount, and then perform the estimation again using the joint estimation result and the coupling degree estimation result. In this case, the joint estimation part 113 outputs the first joint estimation result to the coupling degree estimation part 114, and the coupling degree estimation part 114 outputs the first coupling degree estimation result to the joint estimation part 113. The joint estimation part 113 obtains the second joint estimation result using the feature amount, the first joint estimation result, and the first coupling degree estimation result. The coupling degree estimation part 114 obtains the second coupling degree estimation result using the feature amount, the first joint estimation result, and the first coupling degree estimation result. At this time, the joint estimation part 113 and the coupling degree estimation part 114 use parameters different from those of the first time. Further, the joint estimation part 113 and the coupling degree estimation part 114 may perform the estimation process three or more times. Accordingly, the accuracy of the estimation is improved.

Second Embodiment

Figure 8:
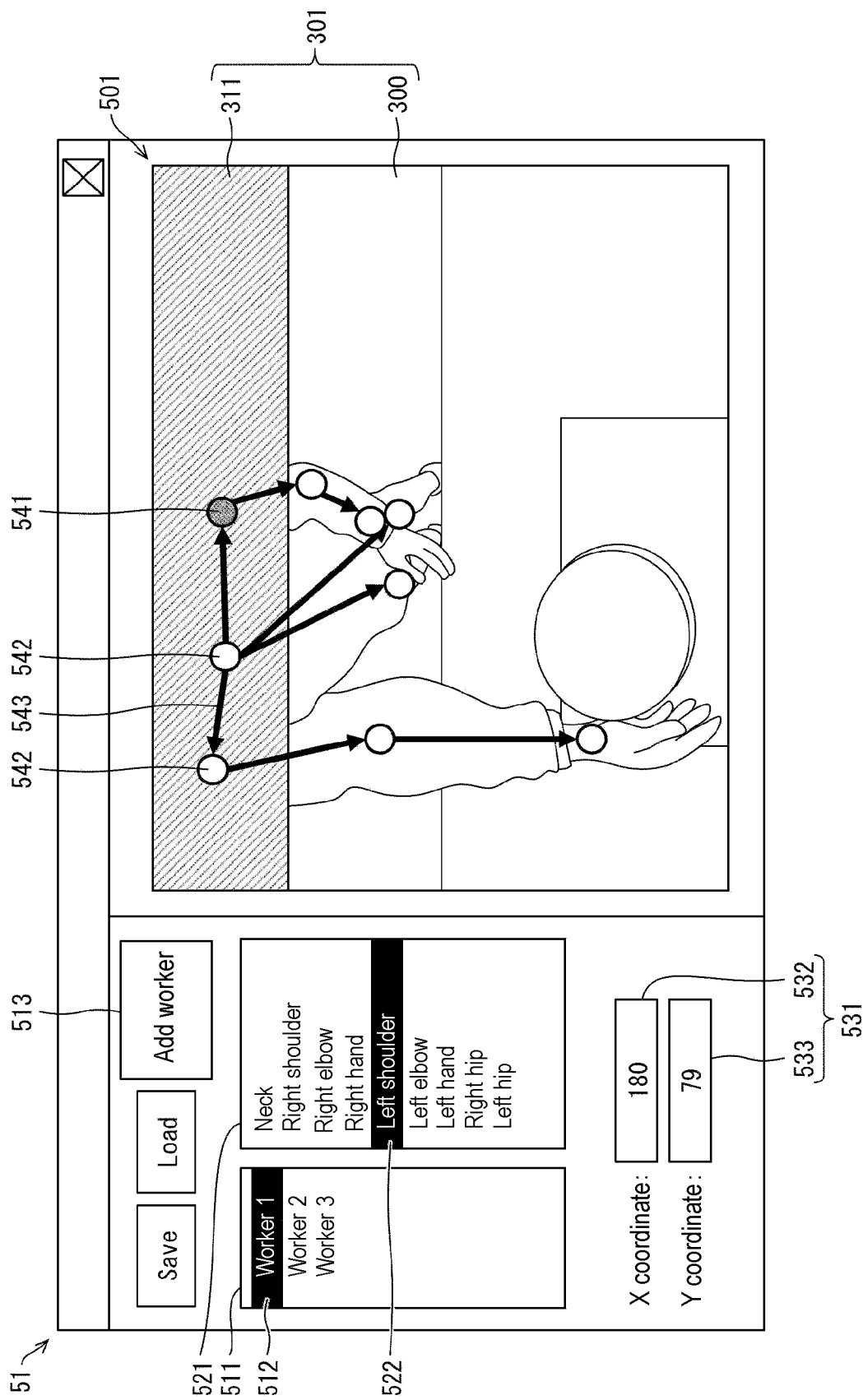
FIG. 8 is an example of the user interface for designating a joint position in the teaching data creation part according to the second embodiment of the present invention.
Figure 9:
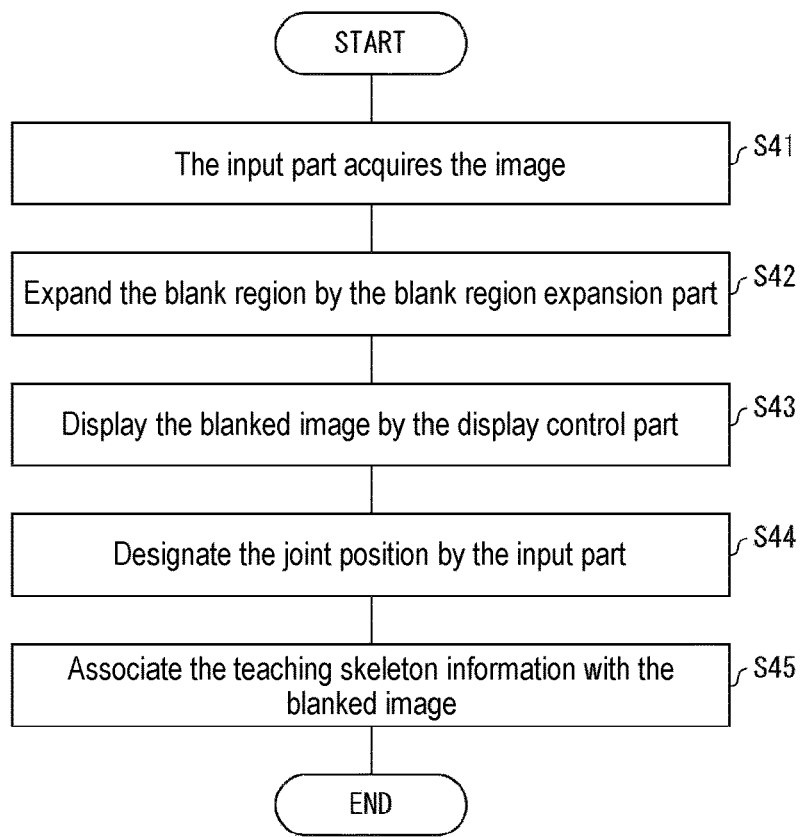
FIG. 9 is an operation flowchart of the teaching data creation device according to the second embodiment of the present invention.

Other embodiments of the present invention will be described below with reference to FIG. 7 to FIG. 9. For convenience of explanation, members having the same functions as those described in the above embodiment will be assigned with the same reference numerals, and the description thereof will not be repeated.

1. Configuration Example

The configuration of a teaching data creation device 2 according to the present embodiment will be described with reference to FIG. 7. FIG. 7 is a block diagram showing an example of the main configuration of the teaching data creation device 2.

Figure 7:
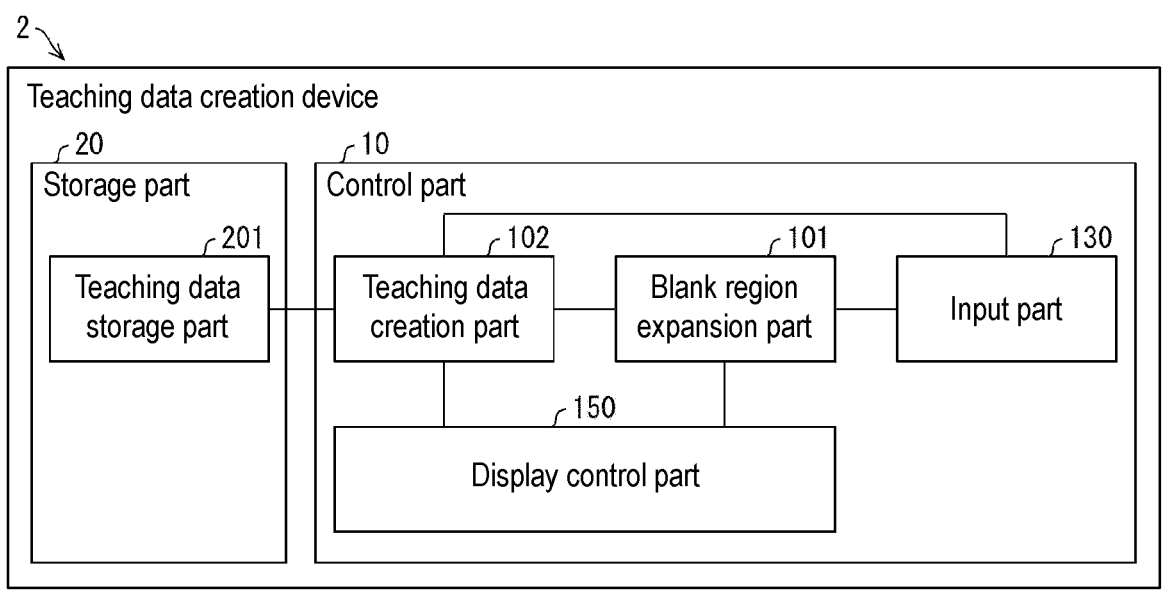
FIG. 7 is a block diagram showing an example of the main configuration of the teaching data creation device according to the second embodiment of the present invention.

As shown in FIG. 7, the teaching data creation device 2 includes a control part 10 that integrates and controls each part of a learning data creation device, and a storage part 20 that stores various data used by the teaching data creation device 2. The storage part 20 may be a device externally attached to the teaching data creation device 2.

The control part 10 includes a blank region expansion part 101, a teaching data creation part 102, an input part 130, and a display control part 150.

The display control part 150 has a function of displaying the state of the teaching data creation device 2 and displaying an image. A display device (not shown) which is a target controlled by the display control part 150 may be a device externally attached to the teaching data creation device 2.

A user interface of the learning data creation device according to the present embodiment will be described with reference to FIG. 8. FIG. 8 is an example of the user interface 51 for designating a joint position in the teaching data creation part.

The user interface 51 includes an image display part 501, a worker list 511, an add worker button 513, a joint list 521, and a coordinate display instruction part 531. The display of the user interface 51 is controlled by the display control part 150.

The image display part 501 is a region for displaying the blanked image 301 according to the instruction of the display control part 150. In addition, an edited joint position 541, a definite joint position 542, and coupling information 543 input by the user input are displayed. The edited joint position 541 and the definite joint position 542 are displayed differently from each other so that they can be identified. The coupling information 543 is a display representing the coupling between the joints according to the coupling relationship of the joints described above. The coupling information 543 is indicated by an arrow in FIG. 8, but not limited thereto, and the coupling information 543 may be a line segment.

The worker list 511 is a list of workers included in the blanked image 301. If the blanked image 301 includes only one worker, only "worker 1" is used. The worker that is being set in the worker list 511 may be highlighted as an edited worker 512.

The joint list 521 is a list of joints that have to be set for the worker. There are nine joints to be set, which are the neck, right shoulder, right elbow, right hand, left shoulder, left elbow, left hand, right hip, and left hip, but not limited thereto, and the head and legs can also be set. The joint that is being set (corresponding to the edited joint position 541) in the joint list may be highlighted as an edited joint 522.

The coordinate display instruction part 531 indicates the pixel coordinates that are being set of the edited joint 522, and includes an X coordinate display instruction part 532 for the X coordinate and a Y coordinate display instruction part 533 for the Y coordinate. In addition to displaying the pixels currently being set for both the X and Y coordinates, user input is also accepted. When the coordinates are changed by the user input, the display position of the edited joint position 541 is also changed by the display control part 150.

When changing the coordinates of the edited joint 522 by the input part 130 and the coordinate display instruction part 531, the user may designate the coordinates that enter the blank region 311 as the coordinates.

2. Operation Example

The operation of the teaching data creation device 2 according to the present embodiment will be described with reference to FIG. 9. FIG. 9 is an operation flowchart of the teaching data creation device 2.

The input part 130 acquires the image 300 and outputs the image 300 to the blank region expansion part 101 (S41). The blank region expansion part 101 adds the blank region 311 adjacent to the side of the input image 300 and creates the blanked image 301. The blank region expansion part 101 outputs the blanked image 301 to the teaching data creation part 102 and the display control part 150 (S42).

The display control part 150 causes the display device to display the user interface 51. The display control part 150 displays the blanked image 301 on the image display part 501 (S43). The input part 130 receives input from the user via a mouse, keyboard, touch panel, or the like. For example, the input part 130 receives addition of a worker by the add worker button 513, selection of a worker in the worker list 511, selection of the edited joint in the joint list 521, and designation of the edited joint position in the coordinate display instruction part 531 or the image display part 501 (S44). At this time, the input part 130 receives not only designation of the joint position of the joint located in the image 300 but also designation of the joint position of the joint located in the blank region 311. The input part 130 outputs the input information of the worker, joint, and joint position to the teaching data creation part 102 in association with each other.

The teaching data creation part 102 changes the display of the display control part 150 based on the user input. Further, the teaching data creation part 102 generates the teaching skeleton information 312 including information of one or more workers, a plurality of joints, and a plurality of joint positions. The plurality of joints include a first joint located in the region of image 300 and a second joint located in the blank region 311. The teaching data creation part 102 creates the skeleton-containing data 302 by associating the teaching skeleton information 312 with the blanked image 301 (S45).

The teaching data creation part 102 stores the skeleton-containing data 302 in the teaching data storage part 201.

3. Function/Effect

As described above, the teaching data creation device 2 according to the second embodiment expands the blank region 311 after the input part 130 inputs the image 300, and displays the blanked image 301 on the user interface 51. The teaching data creation device 2 can create the teaching skeleton information 312 corresponding to the blanked image 301 by receiving input of the joint position of the joint corresponding to the blank region 311 from the user.

The joint positions constituting the teaching skeleton information may be set in the blank region 311. Accordingly, an image considering privacy in which the head, neck, shoulder, etc. are missing can be input in the input part, and the teaching skeleton information 312, which is the data for learning used in the first embodiment, can be created.

Third Embodiment

Yet other embodiments of the present invention will be described below with reference to FIG. 10 and FIG. 11. For convenience of explanation, members having the same functions as those described in the above embodiment will be assigned with the same reference numerals, and the description thereof will not be repeated.

An example of an input image according to the present embodiment will be described with reference to FIG. 10 and FIG. 11. FIG. 10 is a schematic diagram of an image of the worker taken from above. FIG. 11 is a schematic diagram of an image of the worker taken from a side.

(Image Taken from Above)

Figure 10:
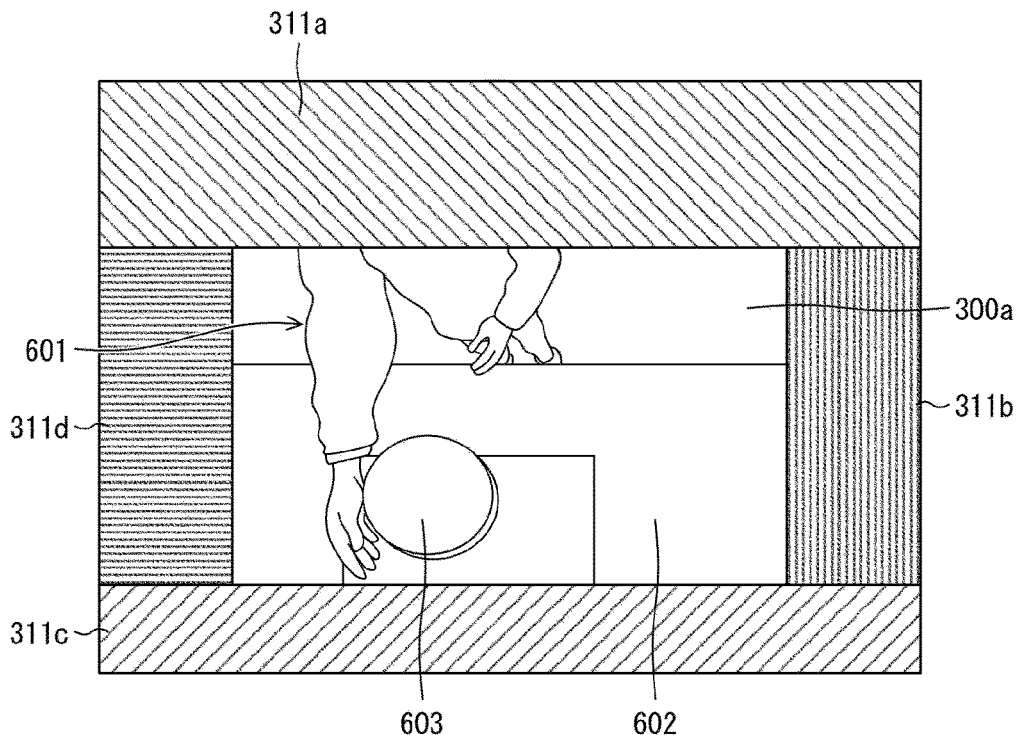
FIG. 10 is a schematic diagram of the image of the worker taken from above according to the third embodiment of the present invention.

As shown in FIG. 10, by photographing from above, it is possible to take the image 300a that allows the situation on the work desk to be easily grasped without capturing the face of the worker. Therefore, by photographing from above, it is possible to obtain an image suitable for work analysis while protecting privacy.

The image 300a includes a worker 601, a work desk 602, and a work target 603. Further, the blank regions 311a, 311b, 311c, and 311d are expanded adjacent to the four sides of the image 300a. In FIG. 10, the blank regions are set to be adjacent to all the four sides, but the present invention is not limited thereto, and the blank region may be set to be in contact with any one or more sides.

The worker 601 is a worker to be subjected to work analysis. Elements related to privacy, such as the face of the worker, may not be included in the image. The work desk 602 is a space where the worker works. The work desk 602 may be not only a work desk with a single shelf but also a desk with multiple shelves. The work target 603 is a target for the worker to work on. A marker or the like may be added to the work desk 602 or the work target 603 for work analysis.

As shown in FIG. 10, by expanding the blank region 311a on the upper part of the image 300a, the skeleton information can be estimated without capturing the face of the worker or the like. By expanding the blank region 311b on the right side of the image 300a, the skeleton information can be estimated even when the worker moves to the left side (right side in the image) or reaches the hand for the work target in the space outside the image 300a. By expanding the blank region 311c on the lower side of the image 300a, the skeleton information can be estimated even when the worker reaches the hand for the work target outside the image 300a. By expanding the blank region 311d on the left side of the image 300a, the skeleton information can be estimated even when the worker moves to the right side (left side in the image) or reaches the hand for the work target in the space outside the image 300a.

Thus, by photographing from above, it is possible to estimate the skeleton information while protecting privacy, and two-dimensional work analysis on the work desk can be easily performed. Further, by adding a plurality of blank regions to be adjacent to a plurality of sides of the image 300a, the skeleton information can be estimated even when the worker moves outside the image 300a.

(Image Taken from the Side)

Figure 11:
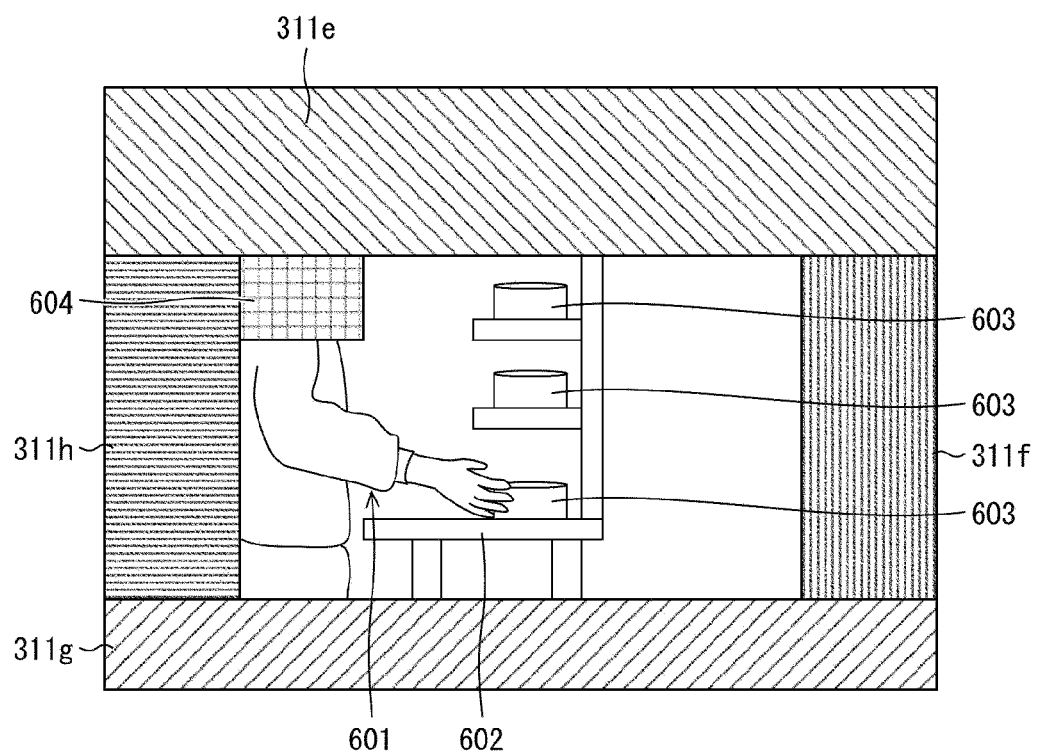
FIG. 11 is a schematic diagram of the image of the worker taken from a side according to the third embodiment of the present invention.

As shown in FIG. 11, by photographing from the side, it is possible to take the image 300b that allows the situation of the multi-tiered workbench to be easily grasped without capturing the face of the worker. Therefore, by photographing from the side, it is possible to obtain an image suitable for work analysis while protecting privacy.

The image 300b includes a worker 601, a work desk 602, a work target 603, and a mask region 604. Further, the blank regions 311e, 311f, 311g, and 311h are expanded adjacent to the four sides of the image 300a. In FIG. 11, the blank regions are set to be adjacent to all the four sides, but the present invention is not limited thereto, and the blank region may be set to be in contact with any one or more sides.

The mask region 604 may be set when an element that invades privacy, such as the face of the worker, will be captured due to the installation position and installation direction of the camera. The mask region 604 is filled with the same single color as the blank region 311. Furthermore, the mask region 604 may be set at an arbitrary position in contact with the blank region and with an arbitrary size.

As shown in FIG. 11, by expanding the blank region 311e on the upper part of the image 300b, the skeleton information can be estimated even when parts or tools are disposed on multiple shelves or when they are disposed on the outer upper part of the image 300b. By expanding the blank region 311f on the right side of the image 300b, it is possible to estimate the skeleton information when the hand is reached for the work target installed in the back as seen from the worker of the workbench. By expanding the blank region 311g on the lower side of the image 300b, it is possible to estimate the skeleton information when the hand is reached for the work target installed on the lower side of the workbench. By expanding the blank region on the left side of the image 300b, the skeleton information can be estimated without capturing the face of the worker or the like.

Thus, by photographing from the side, it is possible to estimate the skeleton information while protecting privacy, and the work analysis on the three-dimensional work desk can be easily performed.

The photographing angle is not necessarily from above or from a side, and it is also possible to take an image from the obliquely upper side behind the worker. In this case, it is possible to simultaneously perform two-dimensional work analysis by photographing from above and three-dimensional work analysis by photographing from the side.

[Example of Implementation by Software]

The control blocks of the estimation device 1 and the teaching data creation device 2 (particularly, the blank region expansion part 101, the teaching data creation part 102, the data expansion part 103, the excess/deficiency region correction part 104, the estimation model acquisition part 111, the feature amount extraction part 112, the joint estimation part 113, the coupling degree estimation part 114, the skeleton estimation part 121, the estimation model learning part 122, the input part 130, the output part 140, and the display control part 150 in the control part 10) may be realized by a logic circuit (hardware) formed in an integrated circuit (IC chip) or the like, or may be realized by software.

In the latter case, the estimation device 1 and the teaching data creation device 2 include a computer that executes commands of a program which is software for realizing each function. The computer includes, for example, one or more processors and a computer-readable recording medium that stores the program. Then, in the computer, the processor reads the program from the recording medium and executes the program, thereby achieving the object of the present invention. For example, a CPU (Central Processing Unit) can be used as the processor. A "non-temporary tangible medium" such as a ROM (Read Only Memory), a tape, a disk, a card, a semiconductor memory, and a programmable logic circuit can be used as the above recording medium. Further, a RAM (Random Access Memory) may be further provided for developing the above program. In addition, the above program may be supplied to the computer via any transmission medium (communication network, broadcast wave, etc.) capable of transmitting the program. One aspect of the present invention can also be realized in the form of a data signal embedded in a carrier wave, in which the above program is embodied by electronic transmission.

[Summary]

In order to solve the above problem, an estimation device according to one aspect of the present invention includes an image acquisition part acquiring a first image that includes a first joint and does not include a second joint of a subject; a blank region expansion part generating a second image obtained by expanding the first image with a blank region; and an estimation part estimating skeleton information including a joint position of the second joint located in the blank region using the second image and a learned estimation model.

According to the above configuration, by adding the blank region to the first image in which the second joint is missing, the skeleton information including the joint position of the second joint located in the blank region can be stably estimated.

The blank region expansion part may set the blank region adjacent to one side of the first image.

According to the above configuration, the joint position of the second joint of the subject existing at a position beyond one side of the first image can be estimated.

The second joint may include a neck joint.

According to the above configuration, the first image can be, for example, an image in which the shoulder, elbow, hand, and hip are shown, but the neck is not shown. Therefore, the skeleton information including the neck can be estimated stably and accurately using the first image in which the face of the subject is not shown.

The image acquisition part may acquire the first image taken from above.

According to the above configuration, by using the image taken from above, for example, the face of the subject can be prevented from being shown, and work analysis can be performed using the work target on the work desk and the skeleton information of the subject (worker) together.

In order to solve the above problem, a learning device according to one aspect of the present invention includes an image acquisition part acquiring a first image that includes a first joint and does not include a second joint of a subject; a blank region expansion part generating a second image obtained by expanding the first image with a blank region; a teaching data storage part storing teaching data including skeleton information, which includes the second joint located in the blank region, and the second image; and a learning part learning an estimation model of skeleton information from the skeleton information and the second image using the teaching data.

According to the above configuration, by adding the blank region to the first image in which the second joint is missing, and including the second joint located on the blank region in the teaching data, the skeleton information having the second joint in the blank region can be learned.

The blank region expansion part may set the blank region adjacent to one side of the first image.

The second joint may include a neck joint.

The learning device may include a data expansion part performing image processing of geometric deformation on the second image to generate a third image; and a deficiency region correction part correcting a deficiency pixel region in a region corresponding to the second image in the third image with a blank region as a new second image for learning.

According to the above configuration, a plurality of pieces of teaching data can be created even from a small number of images, and the learning can be performed efficiently.

The image acquisition part may acquire the first image taken from above.

According to the above configuration, by using the image taken from above, the estimation model can be learned from the work target on the work desk and the skeleton information of the subject (worker).

In order to solve the above problem, a teaching data creation device according to one aspect of the present invention includes an image acquisition part acquiring a first image that includes a first joint and does not include a second joint of a subject; a blank region expansion part generating a second image obtained by expanding the first image with a blank region; a display control part displaying the second image; an input part receiving input of a joint position of the second joint with respect to the blank region in the second image from a user; and a teaching data creation part creating teaching data in which skeleton information including joint positions of the first joint and the second joint is associated with the second image.

According to the above configuration, by adding the blank region to the first image in which the second joint is missing, the teaching data including the joint position of the second joint located in the blank region can be created.

The blank region expansion part may set the blank region adjacent to one side of the first image.

The second joint may include a neck joint.

An estimation method according to one aspect of the present invention includes an image acquisition step of acquiring a first image that includes a first joint and does not include a second joint of a subject; a blank region expansion step of generating a second image obtained by expanding the first image with a blank region; and an estimation step of estimating skeleton information including a joint position of the second joint located in the blank region using the second image and a learned estimation model.

A learning method according to one aspect of the present invention includes an image acquisition step of acquiring a first image that includes a first joint and does not includes a second joint of a subject; a blank region expansion step of generating a second image obtained by expanding the first image with a blank region; a teaching data acquisition step of acquiring teaching data including skeleton information, which includes the second joint located in the blank region, and the second image; and a learning step of learning an estimation model of skeleton information from the skeleton information and the second image using the teaching data.

A teaching data creation method according to one aspect of the present invention includes an image acquisition step of acquiring a first image that includes a first joint and does not include a second joint of a subject; a blank region expansion step of generating a second image obtained by expanding the first image with a blank region; a display control step of displaying the second image; an input step of receiving input of a joint position of the second joint with respect to the blank region in the second image from a user; and a teaching data creation step of creating teaching data in which skeleton information including joint positions of the first joint and the second joint is associated with the second image.

The estimation device according to each aspect of the present invention may be realized by a computer, and in this case, an estimation program that realizes the estimation device in the computer by operating the computer as each part (software element) included in the estimation device, and a computer-readable recording medium recording the same also fall within the scope of the present invention.

The learning device according to each aspect of the present invention may be realized by a computer, and in this case, a learning program that realizes the learning device in the computer by operating the computer as each part (software element) included in the learning device, and a computer-readable recording medium recording the same also fall within the scope of the present invention.

The teaching data creation device according to each aspect of the present invention may be realized by a computer, and in this case, a teaching data creation program that realizes the teaching data creation device in the computer by operating the computer as each part (software element) included in the teaching data creation device, and a computer-readable recording medium recording the same also fall within the scope of the present invention.

[Additional Notes]

The present invention is not limited to the above-described embodiments, and various modifications can be made within the scope of the claims. The technical scope of the present invention also includes embodiments obtained by appropriately combining the technical means disclosed in different embodiments.

What is claimed is:

1. An estimation device, comprising:
   a first processor, configured to:
   acquire a first image that includes a first joint and does not include a second joint of a subject;
   add a blank region adjacent to the first image to generate a second image; and
   estimate skeleton information including a joint position of the second joint located in the blank region using the second image and a learned estimation model.

2. The estimation device according to claim 1, wherein the first processor sets the blank region adjacent to one side of the first image.

3. The estimation device according to claim 1, wherein the second joint includes a neck joint.

4. The estimation device according to claim 1, wherein the first processor acquires the first image taken from above.

5. A learning device, comprising:
   a memory; and
   a second processor, configured to:
   acquire a first image that includes a first joint and does not include a second joint of a subject;
   add a blank region adjacent to the first image to generate a second image;
   store teaching data including skeleton information, which includes the second joint located in the blank region, and the second image in the memory; and
   learn an estimation model of skeleton information from the skeleton information and the second image using the teaching data.

6. The learning device according to claim 5, wherein the second processor sets the blank region adjacent to one side of the first image.

7. The learning device according to claim 5, wherein the second joint includes a neck joint.

8. The learning device according to claim 5, wherein the second processor is further configured to:
   perform image processing of geometric deformation on the second image to generate a third image; and correct a deficiency pixel region in the third image with another blank region to generate a new second image for learning, wherein the deficiency pixel region in the third image corresponds to a region in the second image.

9. The learning device according to claim 5, wherein the the second processor acquires the first image taken from above.

10. A teaching data creation device, comprising:
a display; and
a third processor, configured to:
  acquire a first image that includes a first joint and does not include a second joint of a subject;
  add a blank region adjacent to the first image to generate a second image;
  display the second image on the display;
  receive input of a joint position of the second joint with respect to the blank region in the second image from a user; and
  create teaching data in which skeleton information including joint positions of the first joint and the second joint is associated with the second image.

11. The teaching data creation device according to claim 10, wherein third processor sets the blank region adjacent to one side of the first image.

12. The teaching data creation device according to claim 10, wherein the second joint includes a neck joint.

13. An estimation method, comprising:
acquiring a first image that includes a first joint and does not include a second joint of a subject;
adding a blank region adjacent to the first image to generate a second image; and
estimating skeleton information including a joint position of the second joint located in the blank region using the second image and a learned estimation model.

14. A learning method, comprising:
acquiring a first image that includes a first joint and does not includes a second joint of a subject;
adding a blank region adjacent to the first image to generate a second image;
storing teaching data including skeleton information, which includes the second joint located in the blank region, and the second image, in a memory; and
learning an estimation model of skeleton information from the skeleton information and the second image using the teaching data.

15. A teaching data creation method, comprising:
acquiring a first image that includes a first joint and does not include a second joint of a subject;
adding a blank region adjacent to the first image to generate a second image;
displaying the second image on a display;
receiving input of a joint position of the second joint with respect to the blank region in the second image from a user; and
creating teaching data in which skeleton information including joint positions of the first joint and the second joint is associated with the second image.

16. A non-transitory computer-readable recording medium, recording an estimation program for operating a computer as the estimation device according to claim 1.

17. A non-transitory computer-readable recording medium, recording a learning program for operating a computer as the learning device according to claim 5.

18. A non-transitory computer-readable recording medium, recording a teaching data creation program for operating a computer as the teaching data creation device according to claim 10.

* * * * *